United States Patent [19]

Inagaki et al.

[11] Patent Number: 4,994,343
[45] Date of Patent: Feb. 19, 1991

[54] OPTICAL INFORMATION RECORDING MEDIUM

[75] Inventors: Yoshio Inagaki, Minami-Ashigara; Masao Yabe, Fujinomiya; Keiichi Adachi, Minami-Ashigara, all of Japan

[73] Assignee: Fuji Photo Film Co., Ltd., Kanagawa, Japan

[21] Appl. No.: 202,587

[22] Filed: Jun. 6, 1988

[30] Foreign Application Priority Data

Jun. 9, 1987 [JP] Japan ................................ 62-143468

[51] Int. Cl.$^5$ ........................... G03C 1/72; G11B 7/24
[52] U.S. Cl. ...................................... 430/270; 430/945
[58] Field of Search ................................ 430/945, 270

[56] References Cited

U.S. PATENT DOCUMENTS

| | | | |
|---|---|---|---|
| 4,538,159 | 8/1985 | Gupta et al. | 430/945 |
| 4,713,314 | 12/1987 | Namba et al. | 430/945 |
| 4,730,902 | 3/1988 | Suzuki et al. | |
| 4,761,181 | 8/1988 | Suzuki | 430/372 |
| 4,763,966 | 8/1988 | Suzuki et al. | |
| 4,767,571 | 8/1988 | Suzuki et al. | |
| 4,791,023 | 12/1988 | Suzuki et al. | |
| 4,851,322 | 7/1989 | Inagaki et al. | |

*Primary Examiner*—Paul R. Michl
*Assistant Examiner*—Thorl Chea
*Attorney, Agent, or Firm*—Birch, Stewart, Kolasch & Birch

[57] ABSTRACT

The present invention relates to an optical information recording medium which comprises a support having provided thereon recording layer(s) on which information can be recorded and/or read out with a laser beam, wherein the recording layer contains at least one of the compounds represented by the following formula (I):

$$\phi^{\oplus} - L = \Psi \; (X^{1 \ominus})_{\frac{1}{l}}$$

wherein $\phi$ and $\Psi$ each represents a heterocyclic residue having nitrogen atom(s), and L represents an optionally substituted methine group, or an optionally substituted trimethine, pentamethine, heptamethine or nonamethine group each formed by linkage through conjugated double bonds, provided that L and at least one of $\phi$ and $\Psi$ combine to form a ring; and $X^{1} \theta$ represents a 1-valent negative ion and l represents 1, 2 or 3, provided that $X^{1} \theta$ may bind to $\phi$, L or $\Psi$ as a substituent is provided by the invention.

The optical information recording media of the invention is capable of maintaining adequate recording characteristics over a long period and thus is excellent in stability.

19 Claims, No Drawings

OPTICAL INFORMATION RECORDING MEDIUM

BACKGROUND OF THE INVENTION

1. Field of the Invention

The present invention relates to optical information recording media each having a recording layer containing a novel dye. Particularly, the invention relates to optical information recording media wherein recording and readout are carried out using laser beams.

2. Description of the Prior Art

Heretofore, information recording media wherein recording and readout of information are each carried out by irradiating a rotating disc-shaped information recording medium with a laser beam have been known. As recording layers in these information media, those wherein metals having low melting points, or metals having low melting points and dielectric substances are used are proposed. However, these recording layers have disadvantages such as poor preservability, low separating ability, low recording density and high manufacturing cost. Recently, it has been proposed and practised that dye thin films whose physical properties may be changed with light of relatively long wavelength are used in recording layers. However, dyes which have absorption bands in long wavelength generally have problems, for example a problem that they have only low stabilities against heat and light. Thus, it is the present state of things that recording layers having recording characteristics which are stable over a long period and satisfactory have not yet been developed.

SUMMARY OF THE INVENTION

Thus, an object of the present invention is to provide optical information recording media each having a dye recording layer which is capable of maintaining adequate recording characteristics over a long period and thus is excellent in stability.

The object of the invention has been attained by an optical information recording medium comprising a support having provided thereon a recording layer on at least one side of the support wherein the recording layer contains at least one of the compounds represented by the following general formula (I):

General formula (I)

$$\phi = L - \Psi^{\oplus} (X^{l-})_{\frac{1}{l}}$$

wherein $\phi$ and $\Psi$ each represent a heterocyclic residue having nitrogen atom(s), and L represents an optionally substituted methine group, or an optionally substituted, trimethine, pentamethine, heptamethine or nonamethine group each formed by linkage through conjugated double bonds, provided that L and at least one of $\phi$ and $\Psi$ combine to form a ring; and $X^{l\ominus}$ represents a 1-valent negative ion and l represents 1, 2 or 3, provided that $X^{l\ominus}$ may bind to $\phi$, L or $\Psi$ as a substituent.

A heterocycle represented by $\phi$ and a heterocycle represented by $\Psi$ may be the same or different, but it is preferable because of easiness of synthesis that the both are the same.

Since at least one of the nitrogen atom(s) in $\phi$ and at least one of the nitrogen atom(s) in $\Psi$ are positioned so that they may be conjugated through L, the general formula (I) may be represented by the general formula (Ia), but in the present specification the structure of this resonance hybrid is represented by the general formula (I) for convenience' sake.

General formula (Ia)

$$\phi^{\oplus} - L = \Psi (X^{l\ominus})_{\frac{1}{l}}$$

wherein the definitions of $\phi$, $\Psi$, L, X and l are the same as in the general formula (I).

Preferred examples of a nitrogen-containing heterocycle represented by $\phi$ or $\Psi$ in the general formula (I) include a 3H-indole ring, a thiazole ring, an oxazole ring, a selenazole ring, a tellurazole ring, an imidazole ring, a pyridine ring, a quinoline ring and an isoquinoline ring, and these rings may each form a condensed ring with a benzene ring, a naphthalene ring, a phenanthrene ring or a 5- to 7-membered heterocycle, or may each have substituent(s).

Particularly preferred heterocycles among those represented by $\phi$ or $\Psi$ are those represented by the following general formulae $\phi$I to $\phi$XVI which are represented by structures each having a positive charge.

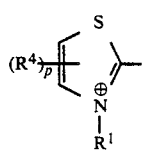
$\phi$I

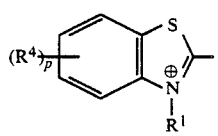
$\phi$II

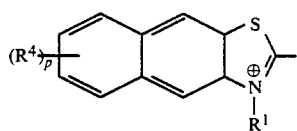
$\phi$III

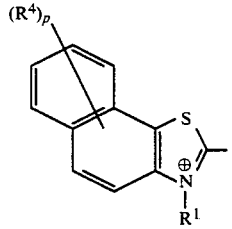
$\phi$IV

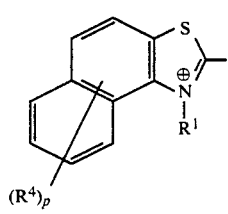
$\phi$V

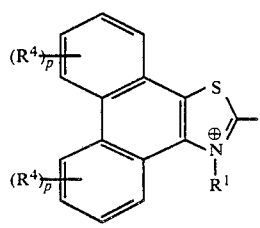
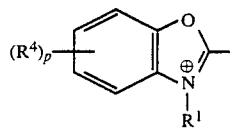
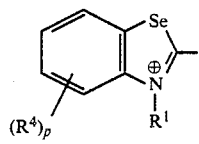
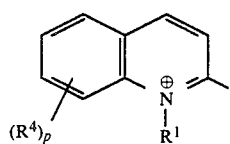
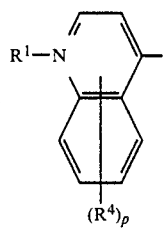
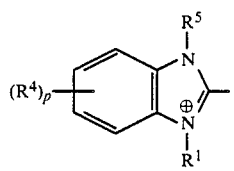
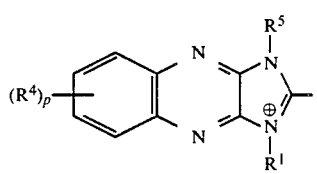
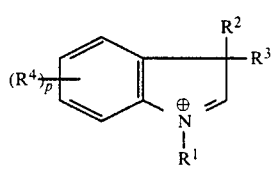

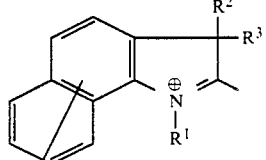
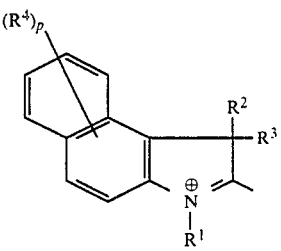
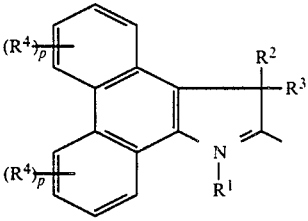

A group represented by $R^1$ or $R^5$ in the heterocycles represented by the general formulae φI to φXVI is a substituted or unsubstituted alkyl group, a substituted or unsubstituted aryl group, or a substituted or unsubstituted alkenyl group, and a substituted or unsubstituted alkyl group is preferable, provided that when $R^1$ or $R^5$ combines with L to form a ring, it represents a divalent connecting group represented by Z later described. The number of carbon atoms the group represented by $R^1$ or $R^5$ is preferably 1 to 30, particularly preferably 1 to 20.

Examples of substituent(s) when these groups have substituent(s) include sulfonic acid group(s), alkylcarbonyloxy group(s), alkylamido group(s), alkylsulfonamido group(s), alkoxycarbonyl group(s), alkylamino group(s), alkylcarbamoyl group(s), alkylsulfamoyl group(s), substituted or unsubstituted alkoxy group(s), substituted or unsubstituted aryloxy group(s), alkylthio group(s), arylthio group(s), substituted or unsubstituted alkyl group(s), substituted or unsubstituted aryl group(s), carboxyl group(s), halogen atom(s), cyano group(s), etc. Particularly preferred examples of these substituents include halogen atom(s) (F, Cl, etc.), cyano group(s), alkoxy group(s) having 1 to 20 carbon atoms (for example, a methoxy, ethoxy, dodecyloxy or methoxyethoxy group), substituted or unsubstituted phenoxy group(s) having 6 to 20 carbon atoms (for example, a phenoxy, 3-dichlorophenoxy or 2,4-di-t-pentylphenoxy group), substituted or unsubstituted alkyl group(s) having 1 to 20 carbon atoms (for example, a methyl, ethyl, isobutyl, t-pentyl, octadecyl or cyclohexyl group), substituted or unsubstituted phenyl group(s) having 6 to 20 carbon atoms (for example, a phenyl, 4-methylphenyl, 4-trifluoromethylphenyl or 3,5-dichlorophenyl group), etc.

Particularly preferred $R^1$ or $R^5$ is an unsubstituted alkyl group having 1 to 8 carbon atoms when they are not bound to L, and a group represented by the later-mentioned Z when they are bound to L.

Further, when the ring of φ(Ψ) is a condensed or noncondensed indolenine ring (the formulae φXIII to φXVI), the substituent represented by $R^2$ or $R^3$ is a substituted or unsubstituted alkyl group (preferably having 1 to 20 carbon atoms), or a substituted or unsubstituted aryl group (preferably a substituted or unsubstituted phenyl group having 6 to 20 carbon atoms). A particularly preferred group represented by $R^2$ or $R^3$ is a methyl group.

Another substituent $R^4$ may be bound to the predetermined position of the ring represented by φ or Ψ. Examples of the substituent include various substituents such as a substituted or unsubstituted alkyl group, a substituted or unsubstituted aryl group, a heterocyclic residue, a halogen atom, a substituted or unsubstituted alkoxy group, a substituted or unsubstituted aryloxy group, an alkylthio group, an arylthio group, an alkylcarbonyl group, an arylcarbonyl group, an alkyloxycarbonyl group, an aryloxycarbonyl group, an alkylcarbonyloxy group, an arylcarbonyloxy group, an alkylamido group, an arylamido group, an alkylcarbamoyl group, an arylcarbamoyl group, an alkylamino group, an arylamino group, a carboxylic acid group, an alkylsulfonyl group, an arylsulfonyl group, an alkylsulfonamido group, an arylsulfonamido group, an alkylsulfamoyl group, an arylsulfamoyl group, a cyano group, a nitro group, etc.

The number (p) of these substituents is usually 0 or 1 to 4. When p is 2 or more, plural $R^4$ groups may mutually be different.

Preferred examples of the substituent represented by $R^4$ include a halogen atom (F, Cl, etc.), a cyano group, a substituted or unsubstituted alkoxy group having 1 to 20 carbon atoms (for example, a methoxy, ethoxy, dodecyloxy or methoxyethoxy group), a substituted or unsubstituted phenoxy group having 6 to 20 carbon atoms (for example, a phenoxy group, 3,5-dichlorophenoxy or 2,4-di-t-pentylphenoxy group), a substituted or unsubstituted alkyl group having 1 to 20 carbon atoms (for example, a methyl, ethyl, isobutyl, t-pentyl, octadecyl, cyclohexyl or trifluoromethyl group), and a substituted or unsubstituted phenyl group having 6 to 20 carbon atoms (for example, a phenyl, 4-methylphenyl, 4-trifluoromethylphenyl or 3,5-dichlorophenyl group). Particularly preferred examples of the group represented by $R^4$ are a halogen atom (F, Cl, etc.), a cyano group, an alkyl group having 1 to 4 carbon atoms, a phenyl group, and an alkyl or phenyl group substituted with a substituent whose Hammett's σm (sigma-meta) constant is positive (for example, a 2-chloroethyl, trifluoromethyl, 2-methoxyethyl, 4-chlorophenyl or 2-phenylsulfonylethyl group).

Particularly preferred heterocycles among those represented by φXIII to φXVI are those of φXIII wherein $R^{2'}$ and $R^{3'}$ are methyl groups and $R^{4'}$ is Cl and which may be bound to L through $R^1$ (φXVII).

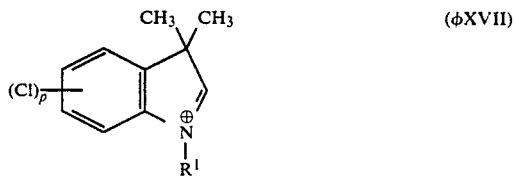

(φXVII)

The group represented by L in the general formula (I) may be substituted, and represents a methine group,
or a group formed by connecting methine groups through conjugated double bonds and selected from a trimethine group, a pentamethine group, a heptamethine group or a nonamethine group. Preferred examples of the L group are groups represented by the general formulae [LI] to [LIX].

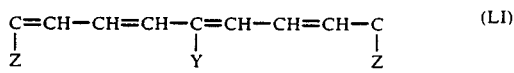

(LI)

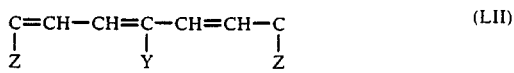

(LII)

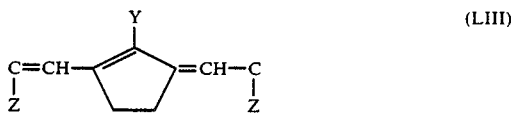

(LIII)

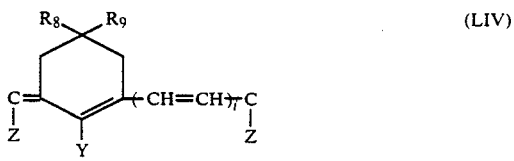

(LIV)

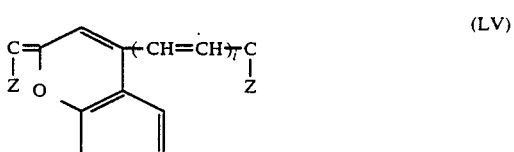

(LV)

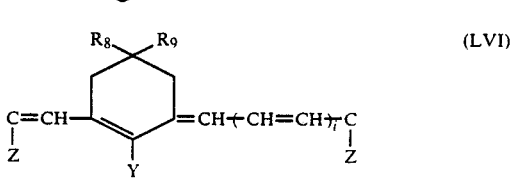

(LVI)

(LVII)

(LVIII)

(LIX)

Particularly preferred groups among these groups are connecting groups forming tricarbocyanine as represented by [LII], [LIII], [LIV], [LV] and [LVI].

In the general formulae [LI] to [LIX], i represents 0 or 1, Z represents a hydrogen atom or a divalent group for forming a ring with connection to φ or Ψ, and Y represents a hydrogen atom or a monovalent group.

Preferred examples of a ring formed containing a divalent group represented by Z are 5-, 6- and 7-membered carbon rings and 5-, 6- and 7-membered heterocycles, and a ring formed by binding Z to the nitrogen atom in φ or Ψ is particularly preferable. Therefore, preferred examples of a divalent group represented by Z are an ethylene group, a propylene group or a butylene group, or a group formed by replacing a methylene group not directly bound to L or Z among optionally substituted methylene groups forming these groups with —O— or —S—, and these groups may have substitutent(s). Particularly preferred examples of the divalent group represented by Z include an ethylene group, a propylene group, a butylene group, —CH₂OCH₂—, —CH₂OCH₂CH₂—, —CH₂SCH₂— and —CH₂SCH₂CH₂—, and these groups may have substituent(s). Examples of such substituent(s) include halogen atom(s), nitro group(s), cyano group(s), optionally substituted alkyl group(s) having 20 or less carbon atoms (for example, methyl, ethyl, trifluoromethyl, 2-methoxyethyl, cyclohexyl or benzyl group(s)), phenyl group(s), substituted phenyl group(s) having 6 to 20 carbon atoms (for example, p-methoxyphenyl, m-chlorophenyl, p-toluyl or p-fluorophenyl group(s)), optionally substituted alkoxy group(s) having 1 to 20 carbon atoms (for example, methoxy, 2-methoxyethoxy or 2,2,3,3-tetrafluoropropyloxy group(s)), phenoxy group(s), substituted phenoxy group(s) having 6 to 20 carbon atoms (for example, p-methoxyphenoxy, 3,5-dichlorophenoxy or p-butylphenoxy group(s)), alkylthio group(s) having 1 to 20 carbon atoms (for example, methylthio, butylthio or dodecylthio group(s)), arylthio group(s) having 6 to 20 carbon atoms (phenylthio group(s), etc.), alkylsulfonyl group(s) having 1 to 20 carbon atoms (for example, methanesulfonyl, butanesulfonyl or dodecanesulfonyl group(s)), arylsulfonyl group(s) having 6 to 20 carbon atoms (for example, phenylsulfonyl, p-toluenesulfonyl or m-chlorobenzenesulfonyl group(s)), etc.

Particularly preferred examples of the divalent group represented by Z are an ethylene group, a propylene group, a butylene group and a group formed by replacing one or more of hydrogen atoms of these groups with F or Cl or with an alkyl group having 1 to 4 carbon atoms.

Preferred examples of the monovalent group represented by Y include a lower alkyl group such as a methyl group, a lower alkoxy group such as a methoxy group, a substituted amino group such as a dimethylamino group, a diphenylamino group, a methylphenylamino group, a morpholino group, an imidazolidino group or an ethoxycarbonylpiperazino group, an alkylcarbonyloxy group such as an acetoxy group, an alkylthio group such as a methylthio group, a cyano group, a nitro group, a halogen atom such as Br, Cl or F, etc. A particularly preferred example of the group represented by Y is a hydrogen atom.

R₈ and R₉ each represent hydrogen atoms or lower alkyl groups such as methyl groups.

Preferred examples of the anion represented by X¹⁻ in the general formula (I) include a halide ion such as I⁻, Br⁻ or Cl⁻, a perhalogenate ion (ClO₄⁻, BrO₄⁻, etc.), BF₄⁻, PF₆⁻, a sulfonate ion (CH₃SO₃⁻, CF₃SO₃⁻,

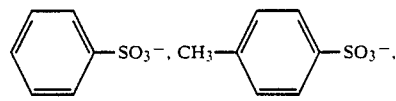

etc.), HSO₃⁻, SO₄²⁻, PO₄³⁻, H₂PO₄³⁻, a heteropolyacid ion ([PO₄·12MoO₃]³⁻, etc.), a carboxylate ion (HCO₃⊖, CO₃²⊖, CH₃CO₂⊖,

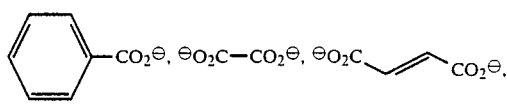

etc.)

X¹⁻ may also be bound to φ or Ψ as a substituent (for example, as —SO₃⁻ or as(CH₂)₄SO₃⁻).

Specific examples of compounds of the present invention represented by the general formula (I) are illustrated below, but the scope of the invention should not be limited thereto.

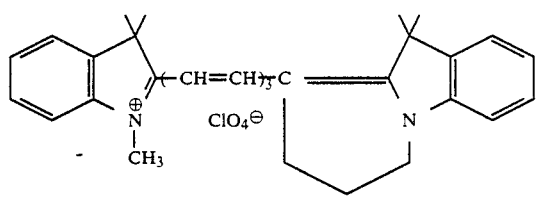

1.

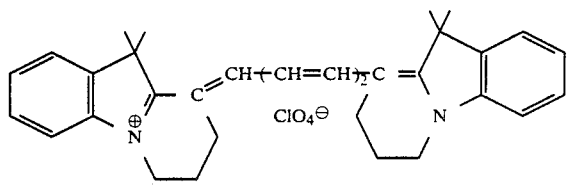

2.

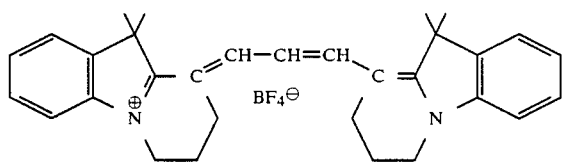

3.

4.
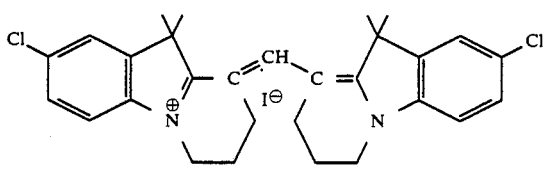
5.
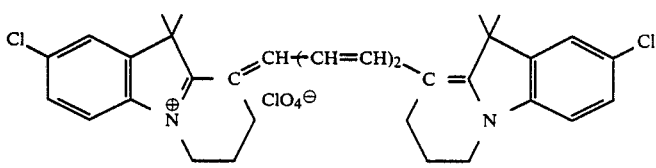
6.
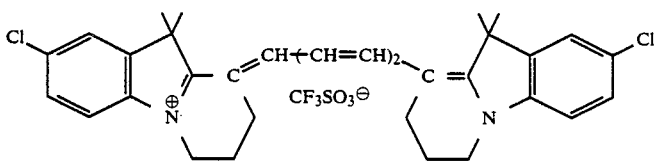
7.
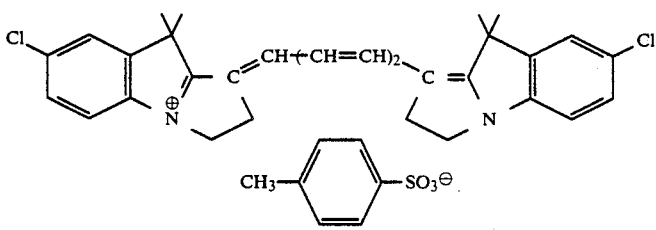
8.
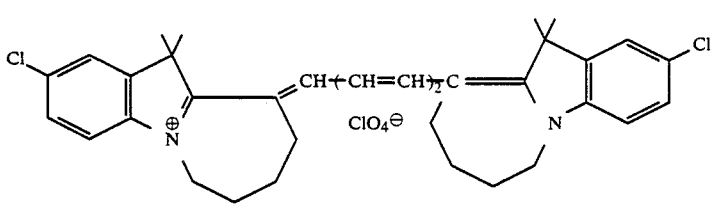
9.
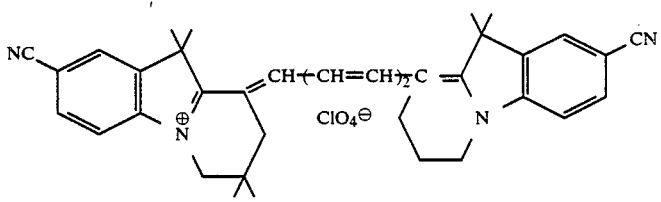
10.
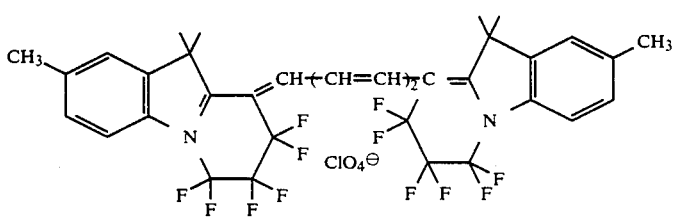

-continued
11.
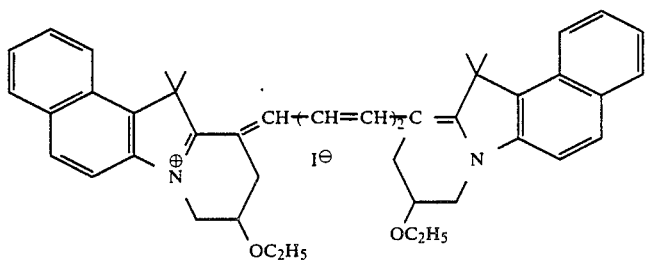
12.
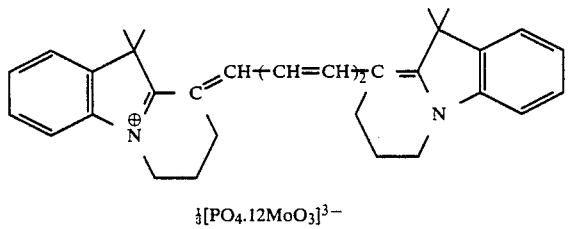
13.
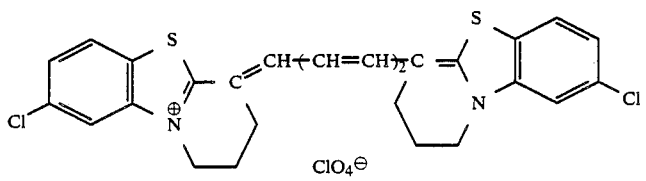
14.
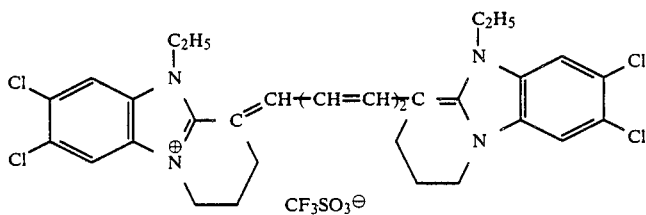
15.
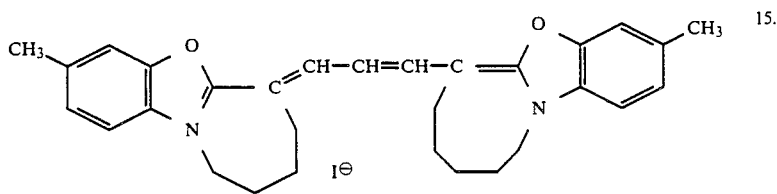
16.
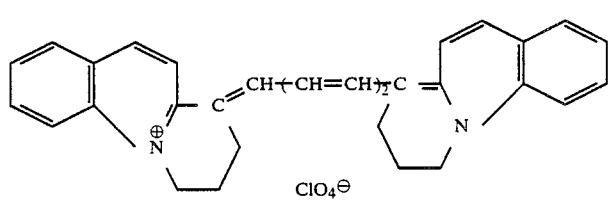
17.
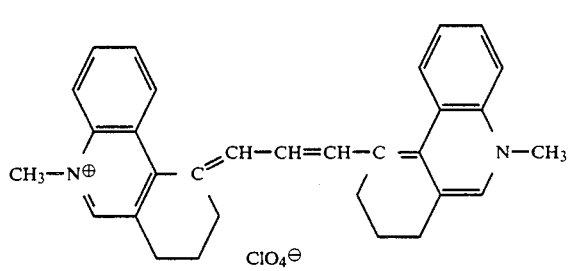

18.

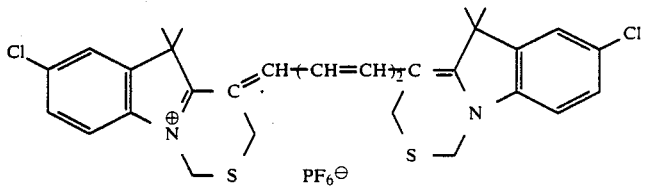

19.

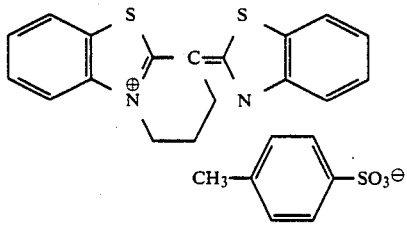

20.

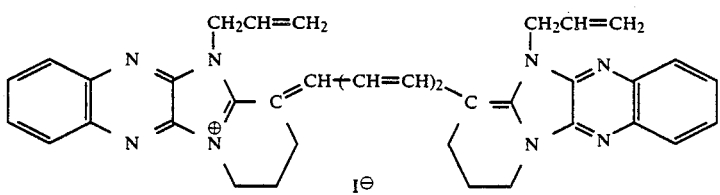

21.

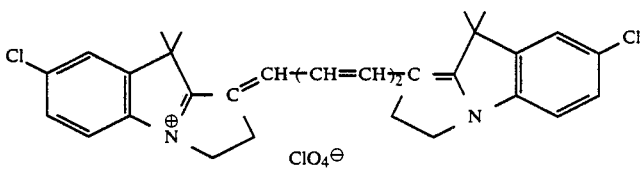

Compounds of the invention represented by the general formula (I) may be synthesized in a method similar to a normal method for synthesis of carbocyanine dyes. That is, a heterocyclic enamine represented by the following general formula (A):

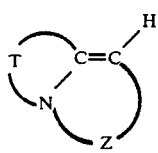

Formula (A)

(wherein T and Z each represent atomic groups necessary for forming a ring, and T constitutes a part of $\phi$), is reacted with an acetal such as

$CH_3O-CH=CH-CH=CH-CH(OCH_3)_2$,

$(CH_3O)_2CH=CH-CH=CH-CH(OCH_3)_2$,

$(CH_3O)_2CHCH_2CH(OCH_3)_2$, or an ortho ester such as ethyl orthoformate or ethyl orthoacetate, or a compound such as

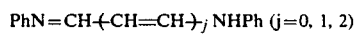
$PhN=CH+CH=CH)_j NHPh$ (j=0, 1, 2)

to form a desired compound.

Synthetic examples of compounds of the invention represented by the general formula (I) is exhibited below.

SYNTHETIC EXAMPLE 1

Synthesis of Compound 2

2,3,3-trimethylindolenine (15.9 g) was dropwise added to 100 ml of 1,3-dibromopropane while heating and stirring on a steam bath over a period of 15 minutes, followed by successive heating and stirring for 4 hours and 20 minutes. The reaction solution was ice-cooled, and the deposited crystals were collected by filtration, washed with acetone and dried to obtain 6 g of 1-(3-bromopropyl)-2,3,3-trimethylindolenium bromide as colorless plates.

Ethanol (50 ml) and 4.2 ml of triethylamine were added to 3.6 g of these crystals, and refluxed while heating for 2 hours and 40 minutes. 1,7-Diphenyl-1,7-diaza-1,3,5-heptatriene (1.4 g) and 1.25 ml of acetic anhydride were added to the reaction mixture, and stirred with occasional heating for 2.5 hours. After addition of 20 ml of ethyl acetate, the reaction solution was poured into 1 l of water, and the resulting crystals were collected by filtration. The crystals were washed with ethyl acetate to obtain 1.5 g of yellowish green crystals. The crystals were dissolved in 150 ml of isopropyl alcohol, and after filtration the solution was diluted with hexane to deposit crystals.

The crystals were collected by filtration and washed with a mixture of isopropyl alcohol and hexane (1:1) to obtain 0.9 g of crystals having metallic luster. The crystals (0.8 were dissolved in methanol, and 1 ml of an aqueous 60% perchloric acid solution was added thereto. The deposited crystals were recovered by filtration, washed with methanol and dried to obtain 0.9 g of compound 2.

Melting point 288.5°-291° C (yellowish green crystals having metallic luster).

SYNTHETIC EXAMPLE 2

Synthesis of Compound 12

The crude crystals (0.8 g) were dissolved in 25 ml of acetic acid, and a solution of 1 g of sodium phosphorus molybdate ($Na_3PO_4 \cdot 12MoO_3$) in 50 ml of acetic acid was added thereto, followed by stirring, in place of the procedure in Synthetic example 1 wherein 0.8 g of the crude crystals were dissolved in methanol and an aqueous 60% perchloric acid solution was added thereto to prepare a salt. The resulting precipitate was recovered by filtration, washed successively with acetic acid, with methanol and with ethyl acetate, and dried under vacuum to obtain 0.5 g of compound 12.

Melting point 300° C or more

Dyes of the general formula (I) used in optical recording media of the invention may be used alone or in combination of 2 or more, or may be used together with dyes other than dyes of the general formula (I). Further, it is also effective to use various antioxidants or singlet oxygen quenchers together therewith for enhancement of reading durability. Further, various resins may also be used together.

It is also possible to increase durability by forming chelate compounds with dyes of the general formula (I) by addition of transition metal ions.

Various quenchers may be used in the invention, but preferred ones are transition metal complexes which lower deterioration by readout and have good compatibility with dyes. Preferred center metals are Ni, Co, Cu, Pd, Pt and the like.

Examples of preferred quenchers which may be used in the invention include quenchers disclosed in J. P. KOKAI No. 62-174741 (U.S. Ser. No. 6364) and which are represented by the following general formulae (II) and (III):

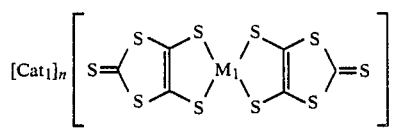
(II)

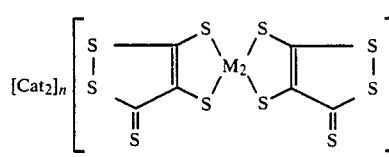
(III)

wherein [Cat$_1$] and [Cat$_2$] represent cations necessary for making the compounds neutral, respectively, M$_1$ and M$_2$ each represent nickel, copper, cobalt, palladium or platinum, and n represents 1 or 2.

Examples of an inorganic cations in the cation represented by [Cat$_1$] or [Cat$_2$] in the aforesaid general formula (II) or (III) include alkali metal ions such as Li$^+$, Na$^+$ and K$^+$, alkaline earth metal ions such as Mg$^{2+}$, Ca$^{2+}$ and Ba$^{2+}$, and NH$_4^+$.

Further, examples of an organic cation therein include quaternary ammonium ions and quaternary phosphonium ions.

Preferred cations among the above cations [Cat$_1$] and [Cat$_2$] are those represented by the following general formulae (IV-a), (IV-b), (IV-c), (IV-d) and (IV-e).

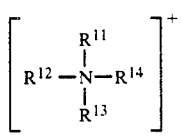
(IV-a)

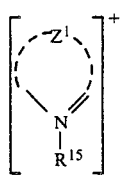
(IV-b)

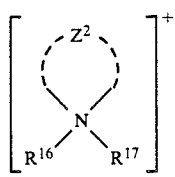
(IV-c)

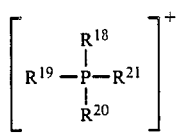
(IV-d)

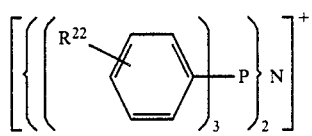
(IV-e)

wherein $R^{11}$, $R^{12}$, $R^{13}$, $R^{14}$, $R^{15}$, $R^{16}$, $R^{17}$, $R^{18}$, $R^{19}$, $R^{20}$, $R^{21}$ and $R^{22}$ each represent a substituted or unsubstituted alkyl group having 1 to 20 carbon atoms, or a substituted or unsubstituted aryl group having 6 to 14 carbon atoms, and $Z^1$ and $Z^2$ each represent a nonmetal atomic group which forms 5-membered or 6-membered ring together with a nitrogen atom or a phosphorus atom in each formula.

Examples of the above substituted or unsubstituted alkyl group having 1 to 20 carbon atoms includes a methyl group, an ethyl group, a n-butyl group, an iso-amyl group, a n-dodecyl group and n-octadecyl group. Examples of the aryl group having 6 to 14 carbon atoms include a phenyl group, a tolyl group and an α-naphthyl group.

These alkyl groups and aryl groups may each be substituted with a cyano group, a hydroxyl group, an alkyl group having 1 to 20 carbon atoms (e.g., a methyl, ethyl, n-butyl or n-octyl group), an aryl group having 6 to 14 carbon atoms (e.g., a phenyl, tolyl or α-naphthyl group), an acyloxy group having 2 to 20 carbon atoms (e.g., an acetoxy, benzoyloxy or p-methoxybenzoyloxy group), an alkoxy group having 1 to 6 carbon atoms (e.g., a methoxy, ethoxy, propoxy or butoxy group), an aryloxy group (e.g., a phenoxy or tolyloxy group), a substituted or unsubstituted aralkyl group (e.g., a benzyl, phenethyl or anisyl group), an alkoxycarbonyl group (e.g., a methoxycarbonyl, ethoxycarbonyl or n-butoxycarbonyl group), an aryloxycarbonyl group (e.g., a phenoxycarbonyl or tolyloxycarbonyl group), an acyl group (e.g., an acetyl or benzoyl group), an acylamino group (e.g., an acetylamino or benzoylamino group), a substituted or unsubstituted carbamoyl group (e.g., an N-ethylcarbamoyl or N-phenylcarbamoyl group), an alkylsulfonylamino group (e.g., a methylsulfonylamino group), an arylsulfonylamino group (e.g., a phenylsulfonylamino group), a substituted or unsubstituted sulfamoyl group (e.g., an N-ethylsulfamoyl or N-phenylsulfamoyl group), an alkyl- or arylsulfonyl group (e.g., a mesyl or tosyl group) or the like.

$Z^1$ and $Z^2$ each represent a nonmetal atomic group necessary for forming a 5-membered ring or a 6-membered ring as aforesaid. The 5-membered ring or 6-membered ring may include a pyridine ring, an imidazole ring, a pyrrole ring, a 2-pyrroline ring, a pyrrolidine ring, a piperidine ring, a pyrazole ring, a pyrazoline ring, an imidazole ring and the like.

Cations represented by the general formula (IV-b) may include, for example, a dodecylpyridinium group, a hexadecylpyridinium group and a dodecylimidazolium group. Cations represented by the general formula (IV-c) may include, for example, an N-ethyl-N-hexadecylpiperidinium group, an N-ethyl-N-dodecylpyrazolidinium group.

Cations preferably used in the invention among cations represented by the above general formula (IV-a), (IV-b), (IV-c), (IV-d) and (IV-e) are (IV-a), (IV-b), (IV-d) and (IV-e) in view of availability of the raw materials and preparation cost.

The type of these cations [Cat$_1$] and [Cat$_2$] has influence on the solubilities of the compounds represented by the aforesaid general formula (II) or (III) in organic solvents.

In general, when substituents binding to the quaternary hetero atom are alkyl groups, solubility of the compound increases as the chain lengths of the alkyl groups become longer. This tendency is remarkable in case of tetraalkyl substituted ammonium or tetraalkyl substituted phosphonium, and cations having a total carbon number of 17 or more in case of ammonium cations and cations having a total carbon number of 4 or more in case of phosphonium cations respectively bestow high solubilities on the compounds.

Enumeration of $M_1$ or $M_2$ in the compounds represented by the aforesaid general formula (II) or (III) in order of preference is nickel, cobalt, copper, palladium and platinium.

The metal complexes of the general formula (II) or (III) have stereostructures of plane four coordination. Though it cannot be definitely determined whether the thioketone groups in the compounds of the general formula (III) exist symmetrically or unsymmetrically in relation to the center metal, the thioketone groups are represented for convenience's sake as in the general formula (III) in the present specification.

The compounds represented by the aforesaid general formula (II) or (III) may be synthesized as follows.

A compound of the general formula (II) (n=2): Disodium 1,3-dithiol-2-thione-4,5-dithiolate obtained by reacting carbon disulfide with sodium is converted to a zinc complex, and benzoyl chloride is reacted with the complex to form a bisbenzoylthio compound. After decomposition with an alkali, the bisbenzoylthio compound is reacted with a metal salt to obtain the captioned compound.

Further, a compound of the general formula (II) (n=1) may be obtained by oxidizing a complex obtained as above-described (n=2) with a proper oxidizing agent.

A compound of the general formula (III) (n=2) may be obtained as follows: First disodium 1,3-dithiol-2-thione-4,5-dithiolate obtained by reaction of carbon disulfide with sodium is heated to about 130° C to isomerize it to disodium 1,2-dithiol-3-thione-4,5-dithiolate. Then, this dithiolate is converted to a zinc complex, and benzoyl chloride is reacted with the zinc complex to form a bisbenzoylthio compound, which is then decomposed with an alkali and reacted with a metal salt to obtain the captioned compound.

A compound of the general formula (III) (n=1) may be obtained by oxidizing a complex obtained as above-described (n=2) with a proper oxidizing agent.

Further, the 1,3-dithiol-2-thione-4,5-dithiolate anion which is an intermediate for obtaining a compound of the general formula (II) or (III) may also be obtained by electrochemical reduction besides the Na-reduction method described above.

Preferred compounds among those represented by the aforesaid general formula (II) are illustrated as follows.

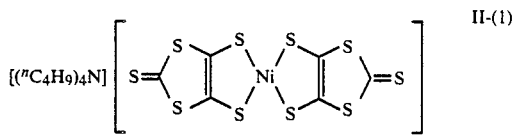

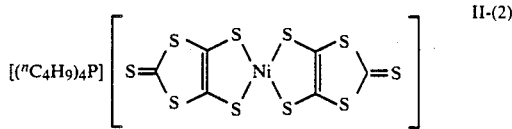

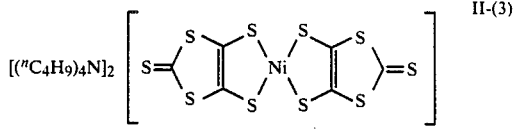

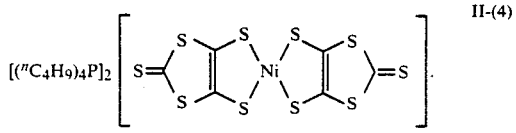

Synthetic examples of compounds represented by the general formula (II) a described as follows.

SYNTHETIC EXAMPLE 1

Synthesis of exemplified compound (II-4)

(1-1) Synthesis of bis(tetraethylammonium)bis(1,3-dithiol-2-thione-4,5-dithiolato)zinc complex All reaction procedures were conducted under an argon atmosphere. 23 g of sodium was cut into small pieces and dispersed in 180 ml of carbon disulfide, followed by dropwise addition at a slow speed of 200 ml of dimethylformamide thereto with stirring. During the dropwise addition, caution should be given so that the mixture does not rapidly generate heat. After the dropwise addition of dimethylformamide, the mixture was gently heated with caution and refluxed for 24 hours. After completion of the reaction the unreacted sodium was removed by filtration. Then, 50 ml of ethanol was added to the filtrate, and the mixture was stirred at room temperature for 2 hours. Carbon disulfide was distilled away from this solution at room temperature under reduced pressure. Then, 300 ml of water was slowly added dropwise thereto and the resulting solution was filtered.

Separately in advance, 20 g of zinc chloride was dissolved in 500 ml of methanol and 500 ml of concentrated ammonia water was added thereto to prepare a solution. This solution was added to the above filtrate at room temperature. After stirring for 5 minutes, an aqueous solution of 53 g of tetraethylammonium bromide in 250 ml of water was added to the mixture to immediately form a red precipitate, which was recovered by filtration and air-dried to obtain the captioned zinc complex.

(1-2) Synthesis of 4,5-bis(benzoylthio)-1,3-dithiol-2-thione 22 g of the zinc complex obtained in (1-1) was dissolved in 500 ml of acetone and filtered. 150 ml of benzoyl chloride was added to the filtrate with stirring to form immediately a yellow precipitate. The precipitate was recovered by filtration, washed with water and air-dried to obtain 16 g of the captioned compound.

(1-3) Synthesis of exemplified compound (II-4)

9.2 g of the bis(benzoylthio) compound obtained in (1-2) was dissolved in 50 ml of methanol. Then, 6.3 g of a 28% methanol solution of sodium methoxide was added thereto, followed by stirring for 10 minutes. To this solution was added a solution of 2.4 g of nickel chloride hexahydrate in 50 ml of methanol, and the mixture was stirred at room temperature for 30 minutes. To the resulting solution was added a solution of 8.5 g of tetrabutylphosphonium bromide in 100 ml of methanol to form immediately a black precipitate. The mixture was stirred for additional 20 minutes and filtered. The solid was washed with acetone, air-dried and recrystallized from acetone-isopropyl alcohol to obtain the captioned compound. Yield 3.8 g.

SYNTHETIC EXAMPLE 2

Synthesis of exemplified compound (II-2)

1 g of the nickel complex obtained in (1-3) was dissolved in 60 ml of acetone, and 30 ml of acetic acid was added thereto. The mixture was stirred for 3 hours and the solvent was distilled away to deposit black crystals, which was then recrystallized from acetone-methanol to obtain the desired exemplified compound (II). Yield 0.4 g, m.p. 185° C, λmax: 1125 nm, δmax: $2.51 \times 10^4$ (in $CH_2Cl_2$).

Examples of known quenchers which may be used in the invention include the following compounds disclosed in J. P. KOKAI No. 59-178295:

(i) Bisdithio-α-diketone series

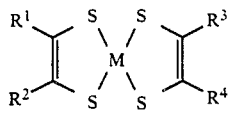

wherein $R^1$ to $R^4$ each represent an alkyl group or an aryl group, and M represents a divalent transition metal atom, (ii) Bisphenyldithiol series

wherein $R^5$ and $R^6$ each represent an alkyl group or a halogen atom, and M represents a divalent transition metal atom, (iii) Acetylacetonate chelate series,
(iv) Dithiocarbamic acid chelate series,
(v) Bisphenylthiol series,
(vi) Thiocatechol chelate series,
(vii) Salicylaldehyde oxime series,
(viii) Thiobisphenolate chelate series,
(ix) Phosphorus acid chelate series,
(x) Benzoate series,
(xi) Hindered amine series,
(xii) Transition metal salts, Besides the above compounds, amminium series or diimonium series compounds represented by the following formula may also be used in the invention as known quenchers:

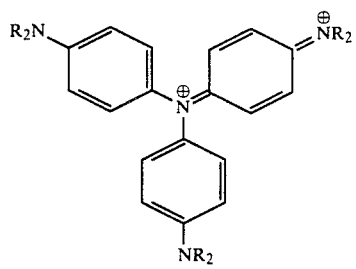

wherein R represents an alkyl group or an aryl group. Specific examples thereof include IRG-002, IRG-003, IRG-022 and IRG-033 each manufactured by NIPPON KAYAKU CO., LTD.

A binding compound of a cation of aforementioned dye(s) of the invention to an anion of a quencher may also be used in the invention.

A quencher is generally used in an amount of 0.05 to 12 moles, preferably 0.1 to 1.2 moles per 1 mole of dye(s) of the invention.

Though a quencher is preferably contained in the dye thin film recording layer, it may be contained in a layer different from the recording layer. It is possible to provide a subbing layer on the support, a protective layer on the recording layer, and/or a reflective layer on the support or on the recording layer, and/or a reflective layer on the support or on the recording layer in the optical recording medium of the invention.

An optical recording medium of the invention basically comprises a support and a dye thin film recording layer. The medium may further have an undercoat layer, a protective layer, etc. according to necessity.

Any known support may be used so long as it is transparent for the laser to be used. Typical examples thereof are glasses and plastics such as acryls, polycarbonates, polysulfones, polyimides, polyesters, amorphous polyolefins and the like. The support may be used in various shapes such as disc-like, card-like, sheet-like and roll film-like shapes.

A groove may be formed on the glass or plastic support in order to make tracking during recording easy. Further, a subbing layer of a plastic binder, or an inorganic oxide, an inorganic sulfide or the like may be provided on the glass or plastic support. A subbing layer having a thermal conductivity lower than the support is preferable. Further, it is also possible to make two recording media facing with each other so that both recording layers are mutually positioned inside, namely to make two recording media into a so-called air sandwich structure, or to stick two recording media together so that both recording layers are mutually positioned inside.

The dye thin film in the invention may be formed, for example, by dissolving a dye represented by the general formula (I) in an organic solvent (for example, methanol, ethanol, isopropyl alcohol, 2, 2, 3, 3-tetrafluoropropanol, dichloromethane, dichloroethane or acetone), and, if necessary, adding a proper binder (for example, PVA, PVP, polyvinyl butyral, polycarbonate, nitrocellulose, polyvinyl formal, methyl vinyl ether, chlorinated paraffin, maleic anhydride copolymer, or styrene-butadiene copolymer, and applying the solution (for example by spin coating) onto a support. The die thin film may also be formed by vacuum-depositing a dye represented by the general formula (I). When a binder is used, it is preferable to use it in an amount of 2 times or less the weight of the dye. Further, it is also possible to form a thin film according to Langmuir-Blodgett's technique using a dye of the general formula (I).

It is possible to provide one or more of the recording layers in the invention.

Film thickness of the recording layer is usually in the range of 0.01 to 1 micron, preferably in the range of 0.03 to 0.8 micron. In case of reflection reading, it is particularly preferable that the thickness is an odd number times the ¼ of laser wave length used for reading.

When a layer for reflecting semiconductor laser, He-Ne laser or the like is provided, the optical recording medium of the invention may be made either by providing a reflecting layer on a support and then providing a recording layer on the reflecting layer in such a manner as aforementioned, or by providing a recording layer on a support and then providing a reflecting layer thereon.

The reflecting layer may be provided by a depositing method, a sputtering method, an ion plating method or the like.

In the optical recording medium of the invention, recording of information is conducted by applying a spot-like high energy beam such as laser (for example, semiconductor laser and He-Ne laser) onto the recording layer through the support or from the opposite side of the support. That is to say, light absorbed in the recording layer is converted to heat and pits are formed in the recording layer.

On the other hand, reading of information is conducted by applying a laser beam with a low power of the threshold value energy or less for recording, and detecting the difference in quantity of reflected light between pitted areas and unpitted areas.

The ratio of readout laser strength to recording laser strength is 1/10 or less in general.

The present invention is further described in detail below according to examples, but the scope of the invention should not be limited thereto.

EXAMPLE 1

A dye and a quencher, and a binder when needed, each shown in Table 1 were dissolved in a mixed solvent of methanol, methyl ethyl ketone, dichloroethane and 2,2,3,3-tetrafluoropropanol in a proper ratio. A surface-hardened polycarbonate support with a groove (pitch 1.6 microns, depth 750 Å) was coated with the solution to a thickness of 0.1 micron using a spinner, and dried. The weight ratio of the dye to the quencher was 3:1, and in the case of using a binder, the weight thereof was 1/5 of the dye.

Then, 0.4 MHz of signal was recorded on the thus obtained recording medium using a semiconductor laser under the condition of 6 mW on the irradiated surface and a beam size of 1.6 microns, whereby pits having a diameter of 1.0 micron were formed by irradiation for 0.3 micro second (1.8 nJ/pit). Feeble laser light was applied onto the recording area to read out the signal, whereby the C/N ratio as shown in Table 1 was obtained.

The following evaluation conditions were applied.

| (Recording and readout) | |
|---|---|
| Laser | Semiconductor laser (GaAlAs) |
| Wavelength of laser | 780 nm |
| Beam size of laser | 1.6 microns |
| Line speed | 5 m/s |
| Recording power | 8 mW |
| Recording frequency | 2.5 MHz |
| Recording duty | 50% |
| Readout power | 0.4 mW |
| (Evaluation of readout deterioration) | |
| Readout power | 1.0 mW |
| Readout number | $10^5$ times |
| (Evaluation of deterioration during preservation) | |
| Preservation temperature and humidity | 60° C, 90% RH |
| Preservation time | 30 days |

Comparative compound A $$\underset{ClO_4^{\ominus}}{\underset{\underset{CH_3}{|}}{\overset{H_3C\ \ CH_3}{\underset{\overset{\oplus}{N}}{\bigvee}}}\!\!\!\!-\!(CH=CH)_3CH=\!\!\!\!\underset{\underset{CH_3}{|}}{\overset{H_3C\ \ CH_3}{\underset{N}{\bigvee}}}\!\!\!\!-Cl}$$

It is seen from the result in Table 1 that the information recording media of the invention are superior to those of the comparative examples in stability in the forced deterioration test.

TABLE 1

| Sample No. | Dye Compound number | Quencher | Binder | C/N (dB) | C/N (dB) after the forced deterioration test 60° C, 90% RH | 1 mW Continuous read-out | Note |
|---|---|---|---|---|---|---|---|
| 1 | A | — | — | 54 | 45 | 42 | Comparative example |
| 2 | A | II-(2) | — | 52 | 45 | 48 | Comparative example |
| 3 | A | — | Polystyrene | 50 | 46 | 42 | Comparative example |
| 4 | A | II-(4) | Chlorinated paraffin | 52 | 46 | 48 | Comparative example |
| 5 | 2 | — | — | 55 | 50 | 47 | Present invention |
| 6 | " | II-(2) | — | 52 | 50 | 50 | Present invention |
| 7 | " | — | Polystyrene | 50 | 49 | 47 | Present invention |
| 8 | " | II-(4) | Chlorinated paraffin | 52 | 50 | 50 | Present invention |
| 9 | 5 | — | — | 53 | 50 | 49 | Present invention |
| 10 | " | II-(2) | — | 52 | 50 | 50 | Present invention |
| 11 | " | — | Polystyrene | 50 | 49 | 48 | Present invention |
| 12 | " | II-(4) | Nitrocellulose | 52 | 51 | 50 | Present invention |
| 13 | 6 | — | — | 55 | 50 | 48 | Present invention |
| 14 | " | II-(2) | — | 53 | 49 | 49 | Present invention |
| 15 | " | — | Nitrocellulose | 51 | 49 | 49 | Present invention |
| 16 | " | II-(4) | Polyvinyl butyral | 52 | 50 | 49 | Present invention |
| 17 | 8 | — | — | 53 | 50 | 48 | Present invention |
| 18 | " | II-(2) | — | 51 | 49 | 50 | Present invention |
| 19 | " | — | Polystyrene | 50 | 49 | 48 | Present invention |
| 20 | " | II-(4) | Polyvinyl formal | 51 | 50 | 50 | Present invention |
| 21 | 12 | — | — | 52 | 52 | 52 | Present invention |
| 22 | " | II-(2) | — | 50 | 50 | 50 | Present invention |
| 23 | " | — | Nitrocellulose | 48 | 48 | 48 | Present invention |
| 24 | " | II-(4) | Chlorinated paraffin | 50 | 50 | 50 | Present invention |
| 25 | 21 | — | — | 55 | 51 | 47 | Present invention |
| 26 | " | II-(2) | — | 52 | 50 | 50 | Present invention |
| 27 | " | — | Polyethylacrylate | 51 | 49 | 48 | Present invention |
| 28 | " | II-(4) | Nitrocellulose | 52 | 50 | 50 | Present invention |

What is claimed is:

1. An optical information recording medium which comprises a support having provided thereon at least one layer on which information can be recorded and/or read out with a laser beam, wherein the recording layer contains at least one of the compounds represented by formula (I):

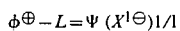

wherein $\phi$ and $\Psi$ each represents a heterocylic residue having at least one nitrogen atom, wherein the heterocyclic residue having at least one nitrogen atom is selected from the group consisting of a 3H-indole ring, a thiazole ring, an oxazole ring, an imidazole ring and a quinoline ring, and these groups may each form a condensed ring with a benzene ring or a naphthalene ring, or may each have at least one substituent, L is a group represented by one of formulas (LI) to (LIX);

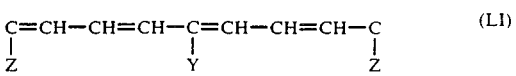

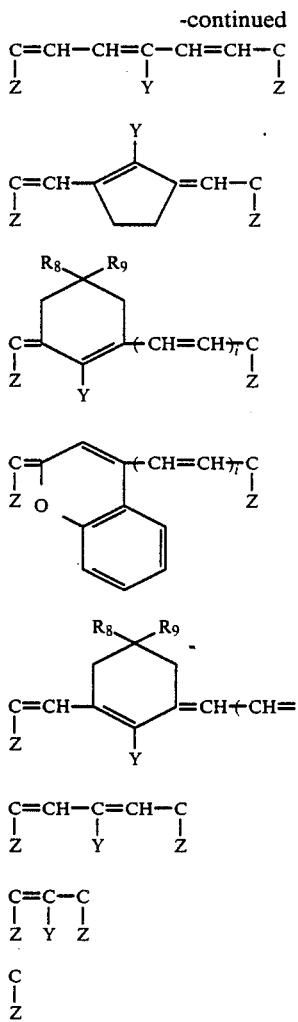

(LII)
(LIII)
(LIV)
(LV)
(LVI)
(LVII)
(LVIII)
(LIX)

wherein i represents 0 or 1,
Z represents a hydrogen atom or a divalent group for forming a ring with connection to φ or Ψ, provided that at least one of Z is the divalent group,
Y represents a hydrogen atom or a monovalent group,
$R^8$ and $R^9$ each represents a hydrogen atom or a lower alkyl group,
the divalent group represented by Z is an ethylene group, a propylene group or a butylene group, and these groups may have substituent(s),
at least one of φ and Ψ, and the divalent group represented by Z combine to form a ring,
$X^{1\ominus}$ represents a 1-valent negative ion provided that $X^{1\ominus}$ may bind to φ, L or Ψ as a substituent, and l represents 1, 2 or 3.

2. The optical information recording medium of claim 1, wherein the heterocyclic residue having nitrogen atom(s) is a group selected from those represented by the general formulae φI to φXVI:

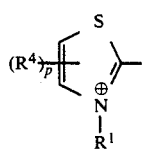

φI

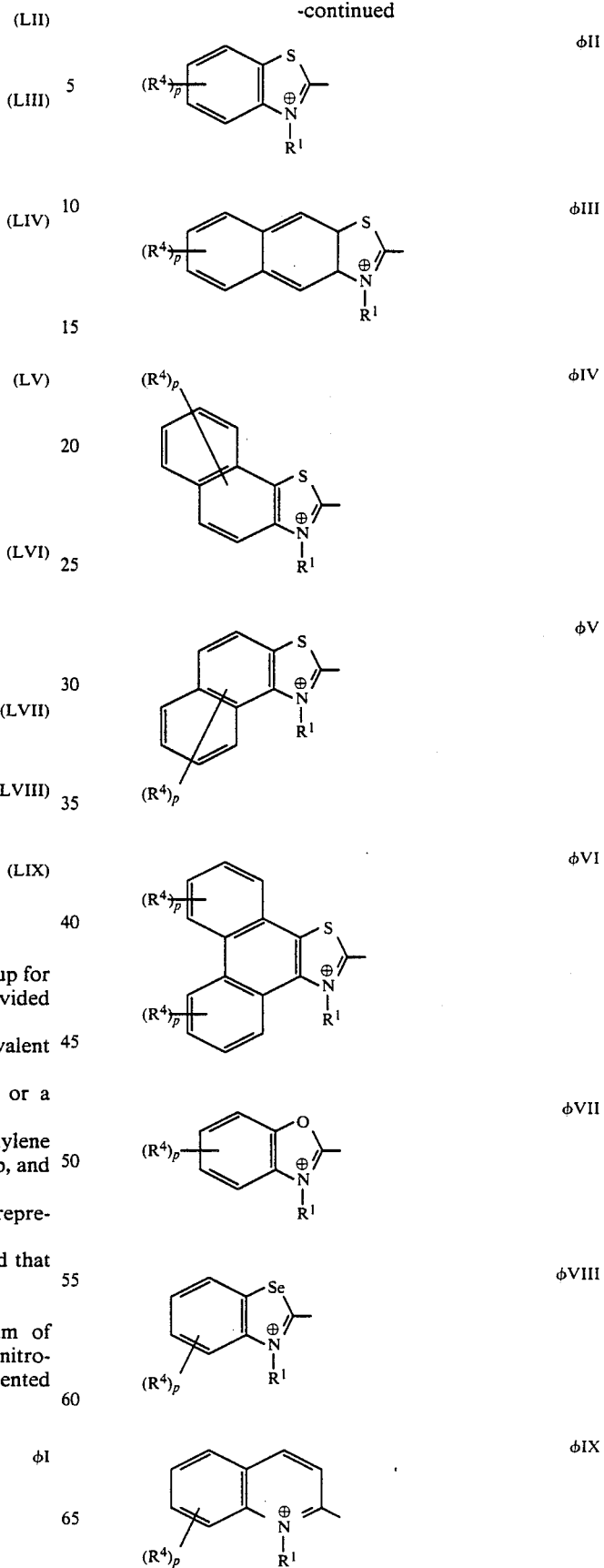

φII

φIII

φIV

φV

φVI

φVII

φVIII

φIX

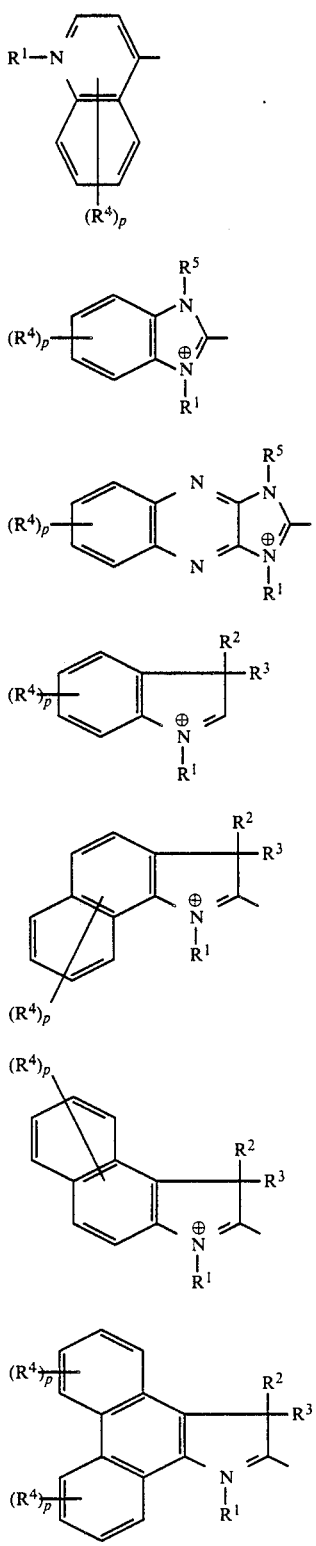

wherein the hetero rings represented by the general formulae φI to φXVI, $R^1$ and $R^5$ each represent a substituted or unsubstituted alkyl group, a substituted or unsubstituted aryl group, or a substituted or unsubstituted alkenyl group, provided that when $R^1$ or $R^5$ combines with L to form a ring, it represents a divalent connecting group; $R^2$ and $R^3$ each represent a substituted or unsubstituted alkyl group, or a substituted or unsubstituted aryl group; $R^4$ represents a substituted or unsubstituted alkyl group, a substituted or unsubstituted aryl group, a heterocyclic residue, a halogen atom, a substituted or unsubstituted alkoxy group, a substituted or unsubstituted aryloxy group, an alkythio group, an arylthio group, an alkylcarbonyl group, an arylcarbonyl group, an alkyloxycarbonyl group, an aryloxycarbonyl group, an alkylcarbonyloxy group, an arylcarbonyloxy group, an alkylamido group, an arylamido group, an alkylcarbamoyl group, an arylcarbamoyl group, an alkylamino group, an arylamino group, a carboxylic acid group, an alkylsulfonyl group, an arylsulfonyl group, an alkylsulfonamido group, an arylfulfonamido group, an alkylsulfamoyl group, an arylsulsamoyl group, a cyano group or a nitro group; and p represents 0 or an integer of 1 to 4.

3. The optical information recording medium of claim 1, wherein the monovalent group in the definition of Y is a lower alkyl group, a lower alkoxy group, a substituted amino group, an alkylcarbonyloxy group, an alkylthio group, a cyano group, a nitro group, or a halogen atom.

4. The optical information recording medium of claim 1, wherein $X^{1\theta}$ represents a halide ion, a perhalogenate ion, $BF_4^-$, $PF_6^-$, a sulfonate ion, $HSO_3^-$, $SO_4^{2-}$, $PO_4^{3-}$, $H_2PO_4^-$, a heteropoly acid ion or a carboxylate ion, and $X^{1\theta}$ may also be bound to φ or Ψ as a substituent.

5. The optical information recording medium of claim 1, wherein the optical information recording medium has at least one of a subbing layer, an undercoat layer, a protective layer and a reflecting layer in addition to the support and the recording layer.

6. The optical information recording medium of claim 5, wherein the subbing layer is provided on the support, the protective layer is provided on the recording layer, and/or the reflecting layer is provided on the support or recording layer.

7. The optical information recording medium of claim 1, wherein a quencher is contained in any one of the layers of the optical information recording medium.

8. The optical information recording medium of claim 7, wherein the quencher is contained in the recording layer.

9. The optical information recording medium of claim 7, wherein the quencher is a compound selected from those represented by the general formulae (II) and (III):

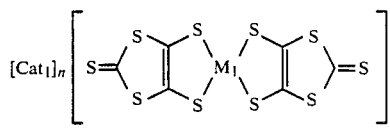

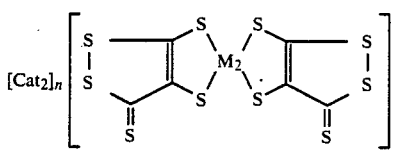

wherein [Cat₁] and [Cat₂] represent cations necessary for making the compounds neutral, respectively, $M_1$ and $M_2$ each represent nickel, copper, cobalt, palladium or platinum, and n represents 1 or 2.

10. The optical information recording medium of claim 9, wherein [Cat₁] and [Cat₂] each represent an metal ion, an alkaline earth metal ion, $NH_4^+$, a quaternary ammonium ion or a quaternary phosphonium ion.

11. The optical information recording medium of claim 10, wherein the quaternary ammonium ion or the quaternary phosphonium ion is represented by one of the general formulae (IV-a) to (IV-e):

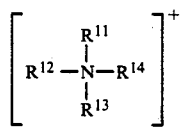 (IV-a)

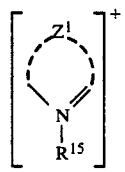 (IV-b)

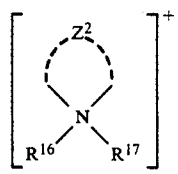 (IV-c)

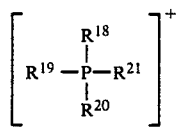 (IV-d)

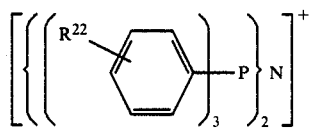 (IV-e)

wherein in general formulae (IV-a) to (IV-e), $R^{11}$, $R^{12}$, $R^{13}$, $R^{14}$, $R^{15}$, $R^{16}$, $R^{17}$, $R^{18}$, $R^{19}$, $R^{20}$, $R^{21}$ and $R^{22}$ each represent a substituted or unsubstituted alkyl group having 1 to 20 carbon atoms, or a substituted or unsubstituted aryl group having 6 to 14 carbon atoms, and $Z^1$ and $Z^2$ each represent a nonmetal atomic group which forms 5-membered or 6-membered ring together with a nitrogen atom or a phosphorus atom in each formula.

12. The optical information recording medium of claim 1, wherein the film thickness of the recording layer is 0.01 to 1 microns.

13. The optical information recording medium of claim 1, wherein φ and Ψ are the same.

14. The optical information recording medium of claim 1, wherein the film thickness of the recording layer is an odd number times ¼ of the laser wavelength used for reading.

15. The optical information recording medium of claim 2, wherein the number of carbon atoms in $R^1$ or $R^5$ is 1 to 30.

16. The optical information recording medium of claim 2, wherein when the ring of φ(Ψ) of formulas φ III to φ XVI is a condensed or an uncondensed indolenine ring, the substituent represented by $R^2$ or $R^3$ is a substituted or unsubstituted alkyl group having 1 to 20 carbon atoms, or a substituted or unsubstituted phenyl group having 6 to 20 carbon atoms.

17. The optical information recording medium of claim 4, wherein the divalent group represented by Z is selected from the group consisting of ethylene, propylene, butylene and substituted or unsubstituted —CH₂OCH₂—, CH₂OCH₂CH₂—, —CH₂SCH₂— and —CH₂SCH₂CH₂—.

18. The optical information recording medium of claim 7, wherein the quencher is present in an amount of 0.05 to 12 moles per 1 mole of the compound of formula (I).

19. The optical information recording medium of claim 9, wherein the quencher of formula (II) is selected from the group consisting of formulae (II-1), (II-2), (II-3) and (II-4):

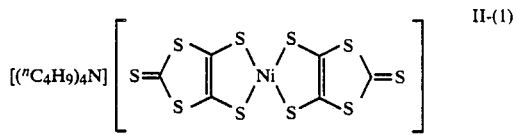 II-(1)

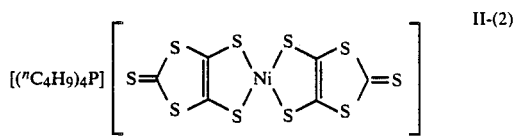 II-(2)

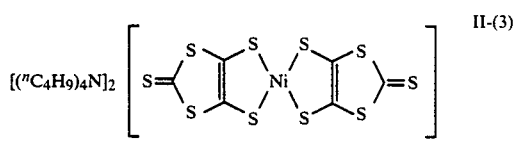 II-(3)

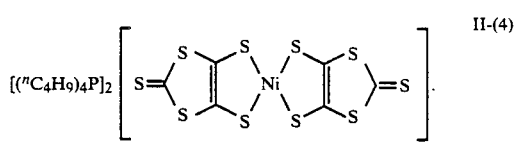 II-(4)

* * * * *